April 22, 1947. M. R. PRICE 2,419,420
SELF CLINCHING NAILING GROUND
Filed Jan. 20, 1945 2 Sheets-Sheet 1
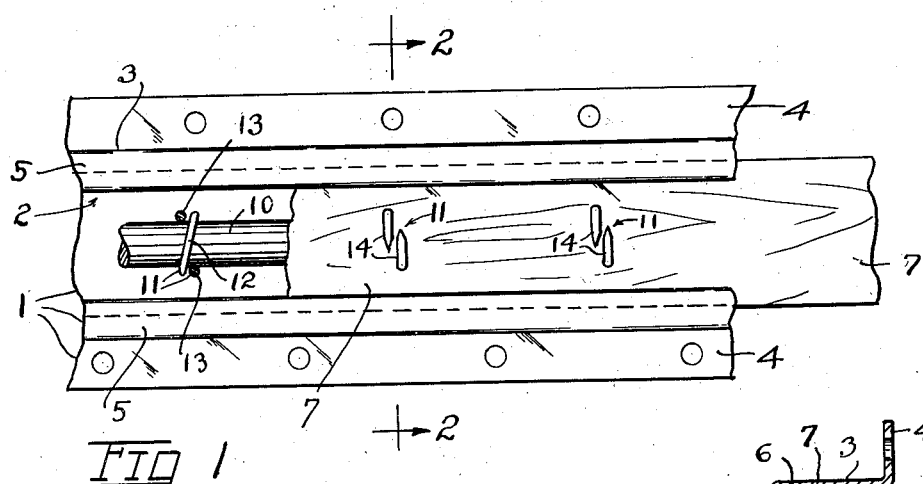
Fig. 1
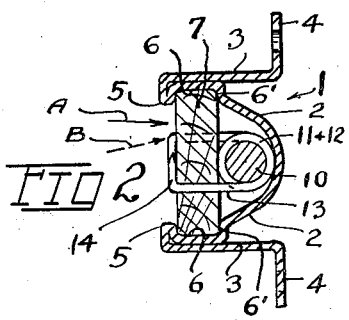
Fig. 2
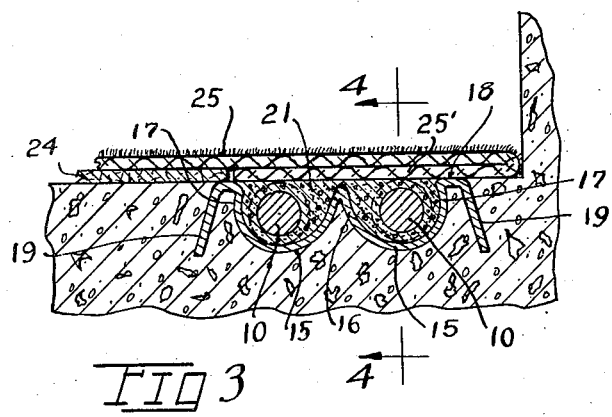
Fig. 3
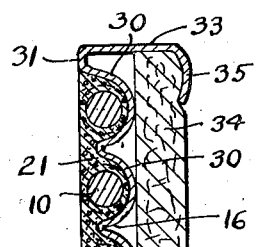
Fig. 4a
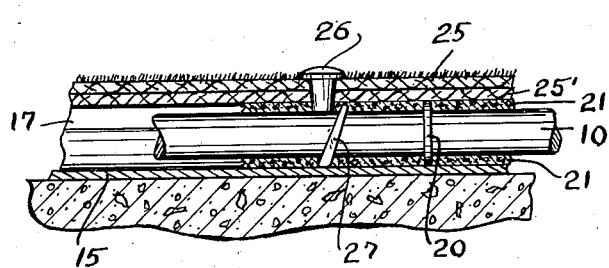
Fig. 4
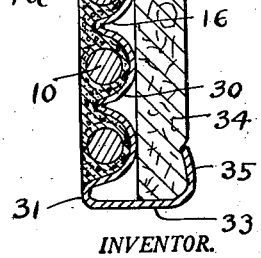
INVENTOR.
MANLEY R. PRICE
BY George M. Soule
ATTORNEY April 22, 1947.  M. R. PRICE  2,419,420
SELF CLINCHING NAILING GROUND
Filed Jan. 20, 1945  2 Sheets-Sheet 2
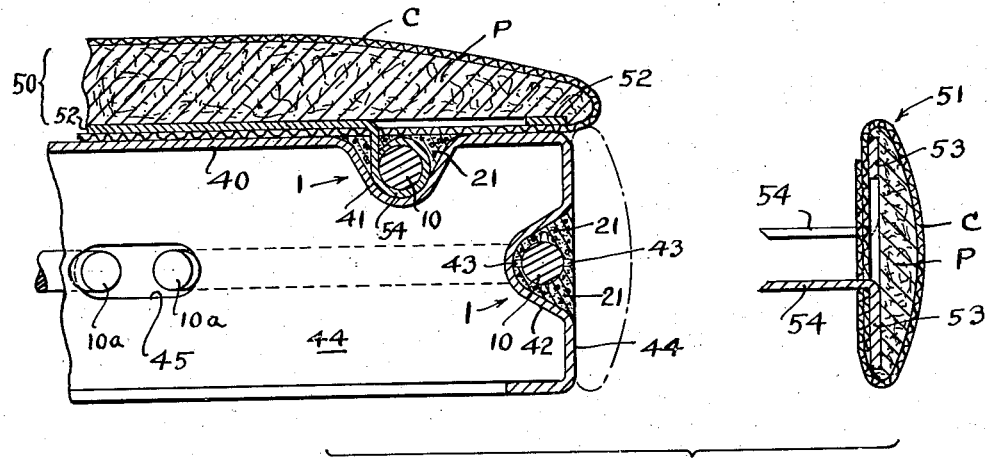
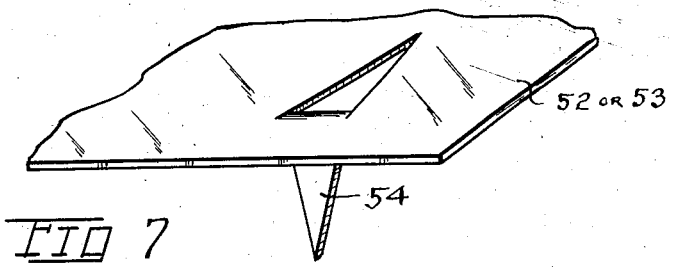
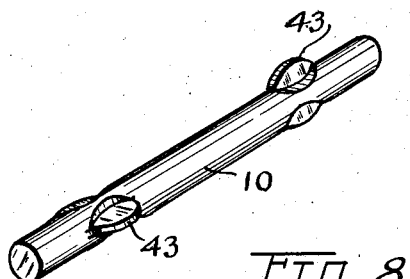
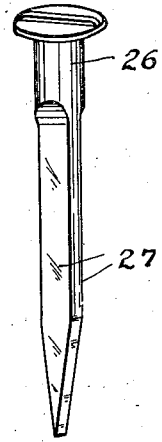
INVENTOR.
MANLEY R. PRICE
BY
George M. Soule
ATTORNEY Patented Apr. 22, 1947

2,419,420

UNITED STATES PATENT OFFICE 2,419,420

SELF-CLINCHING NAILING GROUND

Manley R. Price, Lakewood, Ohio

Application January 20, 1945, Serial No. 573,788

7 Claims. (Cl. 72—105)

This invention relates to an improvement in nailing ground members of the type shown in my Patent 2,160,794 granted May 30, 1939. An object is to extend the practical uses of self-clinching nailing ground on the order of that shown in the patent.

The nailing ground according to my said patent employs open nail-point-deflecting channels and rods held in the channels and about which the deflected nail points curl. While said nailing ground is applicable to general purposes for attaching all sorts of covering or facing members over the ground by nails, the construction has one drawback, namely the possibility of movement of the nailed on covering or facing member in the principal plane thereof or parallel to the main supporting face of the nailing ground when because of the position of the ground or the manner of imposition of working forces to the fastened member there is a tendency for such movement to take place. Although the nails may be driven from such angles as will minimize the movement mentioned, there is always a possibility that the nails will all be driven substantially normal to the supporting face of the ground and if so the shanks of the nails are apt to bend and move laterally about the pivots established by the curled portions of the nails and the rods about which the nail points curl. Also, since the nails are apt to be positioned close to but normally out of contact with metal parts of the nailing ground, there are many installations in which, with the previously proposed construction, the assembly comprised by the nailing ground and facing material secured thereby will rattle. The constructions disclosed hereby eliminate the disadvantages discussed above and present several distinct special advantages which will be discussed hereinafter.

In view of the above a further object is to prevent the clinched fasteners from pivoting about the rods in a manner to permit the material secured by the fasteners to move parallel to the supporting face of the nailing ground.

A further object is to provide a rattle-proof composite self-clinching nailing ground made principally of metal.

Another object is to provide a self-clinching nailing ground construction especially applicable to fastening parts which may occupy various positions, i. e. vertical, inclined, or horizontal, and/or subject to motion or vibration while in use, the construction being such that members secured by the nails are prevented from moving relative to the nailing ground in the principal planes of said members and otherwise.

Other objects and novel features will be brought out in connection with the following description of exemplary forms shown in the drawings, in which:

Fig. 1 is a fragmentary plan view of the improved nailing ground assembly in one form;

Fig. 2 is a sectional view as indicated by line 2—2 on Fig. 1;

Fig. 3 is a view corresponding to Fig. 2 showing a modified form;

Fig. 4 is a longitudinal fragmentary sectional view taken along the line 4—4 on Fig. 3;

Fig. 4a is a fragmentary sectional view on the order of Fig. 3 showing a multiple channel nailing ground embodied in a general purpose construction or wall board;

Fig. 5 is a perspective view of a suitable nail or fastener for use with the nailing ground hereof;

Fig. 6 is an assembly sectional view of a typical metallic article of commerce (chair seat) and embodying the invention in a still different form, and Figs. 7 and 8 are fragmentary perspective views showing parts applicable to constructions particularly on the order of that shown by Fig. 6.

Referring to Figs. 1 and 2 the framework of the nailing ground comprises a sheet metal channel 1 having generally cylindrical or convergently curved or appropriately sloping side wall portions 2 and supporting rearwardly directed flanges 3 terminating in co-planar flanges 4 apertured as shown to receive fasteners such as nails or screws to fasten the channel to a supporting wall or base not shown. The junction of the walls 2 and 3 is formed to provide inwardly overhanging flanges 5 which cooperate with lateral grooves 6 having respective shoulders 6' to retain a nail or other fastener receiving strip 7 which may be wood or other readily penetrable nonmetallic material. Plywood is recommended to minimize the tendency for ordinary wood to become split. The wooden strip is of such cross sectional size as to be readily slipped into the channel from one or either open end thereof and fastened as by slightly indenting the flanges 5 or in some other suitable way. The metal member just described may be formed as by appropriate rolling operations from continuous strip stock of suitable gage. The wooden strip is so spaced from the bottom of the channel 1 that a nail securing rod 10 is easily received into the space bounded by the channel 1 and strip 7.

The rod may lie loosely in said space but preferably the rod is initially secured to the strip 7 at spaced points along the strip so as to hold the rod in spaced relation to all the walls of the channel 1 and preferably also in spaced relation to the strip 7 when the strip is inserted. A convenient method of attachment of the rod 10 is the provision of a plurality of clips similar to staples except that looped portions of the clips extend entirely around the rod, thus forming a definite spacing means to hold the rod out of contact both with the channel walls and the strip 7. The clips 11, as shown, have coils 12 embracing the rod and parallel staple portions 13 extending through the strip 7 and bent over as at 14 against the strip. The staple portions of the clips do not have to extend entirely through the strip 7.

From inspection of Fig. 2 it will be seen that a nail with a flattened shank driven through the strip 7 and into contact with the walls 2 of the channel 1 will be curled about the rod irrespective of which side of the rod the nail may be inserted and, within limits, irrespective of the direction of insertion. Also it will be observed that if the nail is driven into the strip in the direction of the arrow A the member fastened by the nail cannot move downwardly as by the weight of the fastened material so that the shank of the nail can move or bend into the position for example of the arrow B. If, instead of being disposed vertically, as in Fig. 2, the nailing ground is disposed horizontally and the fastened material is subjected to horizontal forces the strip 7 prevents creeping of the fastened material in any direction, as across or along the supporting face of the nailing ground afforded by the flange portions 5.

The problem of creep prevention is presented in the laying of carpets on hard and smooth surfaced floors. Fig. 3 shows the metal nailing ground strip formed as a double channel with channel portions 15 separated by an intermediate nail directing flange or partition 16, the outer walls 17 of the respective channels 15 being extended laterally to form supporting faces at 18 and downwardly and preferably diverging side wall flanges 19 adapted to interlock with originally plastic material such as concrete or plaster and to prevent movement of the composite channel when the flooring composition has solidified or set. The flanges 19 would be of appropriate different design, like the flanges 4 of Fig. 2 for example, in case the flooring is of wood. Each of the channels 15 is provided with a nail retaining rod 10 which may, for example, be maintained generally concentric with the walls of the respective channels 15 as by the provision of flange effects on the rod shown in Fig. 4 in the form of washers 20 (one shown) slipped over the rod or made as parts of the rod. The concrete or plastic into which the composite nailing ground strip is embedded preferably terminates in an upward direction flush with the surfaces 18 as indicated by the drawing and the strip is placed close to the vertical wall of the room to be carpeted, as around all four sides of the room or at least on opposite sides. Lying within the two channels 15 and filling the space unfilled by the rods and washers 20 is a body of material 21 such as pitch-fibre cement an example of which is "dumdum" compound used as sound deadening treatment for auto bodies. The compound remains permanently plastic to some extent (subject to cold flow) and never becomes sufficiently hard or brittle so that fasteners such as carpet tacks cannot be driven into it easily. Such compound would not of itself afford an adequate nail hold but it functions adequately to prevent pivoting of the fasteners out of place in transverse directions as does the wooden strip 7. Additionally, the body of compound is effective to deaden sound (e. g.) prevent rattle.

The body of composition material 21 may be held in the channels by adhesive force of the material on the channel side walls or by the rods 10 if the latter are anchored in place, but preferably in order to insure that the compound will remain in contact with all the channel walls the side portions 17 of said walls adjacent the open nail receiving face of the ground strip inwardly overhang the channels as by slight inward curvature indicated. If the rods have spacing washers or flanges 20 the overhanging wall portions 17 can be so arranged as to hold the rods in place through the intermediary of the washers or flanges.

In the illustrative embodiment shown in Fig. 3 the carpeting is supported generally over the floor surface by padding or liner material 24 which terminates inwardly from all edges of the carpeting as usual; i. e. does not overlie the nailing ground strips. The carpeting shown at 25 may be folded under at the margins as at 25' so that each fastener nail or tack 26, regardless of which channel it enters, will pass through two thicknesses of the carpet. The ground strip can have more or less than the number of channels 15 shown.

The nails or tacks for either of the forms described above (Figs. 2 and 3) preferably comprise ordinary round shanked nails 26 such as shown by Fig. 5, the shaks being flattened as at 27 at least on one side from the point back toward the head for whatever length the nail can come into contact with the converging channel walls or the retaining rods 10. The distance back from the point along which the nails are flattened depends largely upon the thickness of material to be secured by the nails.

The nailing ground for carpeting as shown by Figs. 3 and 4 is illustrative of a horizontal arrangement of nailing ground wherein the secured material would ordinarily be subjected to a force tending to move the secured material in its principal plane or in a plane parallel to the supporting face of the ground strip. The composition 21 has sufficient compressive and tensile strength so that the flattened nails or tacks used to secure the carpet cannot pivot about the rods 10 and thus allow horizontal movement or creeping of the carpeting.

As shown in Fig. 4a the sheet metal channel material substantially according to Fig. 3 is made to constitute part of a construction board unit B for use as building material or general purpose support which may require nails to be inserted at any desired point along one surface to fasten facing or objects such as pictures thereto. The channels 30 in Fig. 4a are disposed close together side by side separated only by the partitions 16 which preferably terminate slightly rearwardly from the border faces 31 of the unit. The side edges of the sheet in which the channels are formed are bent rearwardly as at 33 so as to retain a suitable backing sheet 34 such as insulation board (e. g. Celotex or Masonite). The extremities of the flanges 33 are turned inwardly as at 35 firmly to grip the edge of the board and, if desired or needed, additional securing means such as staples may be provided to hold the intermediate portions of the board 34 against the channel backs. The rods 10 are secured in the channels in the manner previously indicated or in general accordance with my said Patent 2,160,794. Composition 21 fills all the channels to the level of the board faces 31. The construction according to Fig. 4a is especially useful as vertical wall surface members and when so used the units B may be erected with the channels extending either horizontally, vertically or otherwise. The filler compound 21 (or the insertable strips 7, if used instead) prevents pivoting of the fasteners about the rods and resultant movement of the fastened material or members parallel to the principal plane of the unit.

Referring to Fig. 6 this embodiment of an illustrative article of commerce shows installation of channels 1 as part of the make-up of a main supporting body, for instance, the pressed sheet metal body of a chair seat. In Fig. 6 the chair seat bottom panel 40 is indented near its margins (one shown) to form the nail receiving and clinching channels 41 in which the retaining rods 10 are suitably secured. The means for preventing pivotal or lateral movement of the fasteners, and which is especially useful in preventing rattling in case the chair is to serve as a vehicle seat, comprises as shown the same or similar composition 21 as described in connection with Figs. 3 and 4. For retaining upholstery on the chair seat suitable means (not shown) are provided in order to hold the rods in place, and the rods may be provided with centering nibs or projections such as shown at 43, Fig. 8. The nibs may be in sets with the nibs of one set in angular relationship to the nibs of the adjacent set. Thus some of the nibs will be disposed generally downwardly for positioning contact with the bottommost portions of the channels 41 and some laterally for positioning contact with the side walls of the channel in order to hold the rods generally centered in the channels. The rods hold the composition 21 in place. Some of the projections 43 may be welded to the contacted walls of the channel to prevent lifting of the rods 10 out of the respective channels.

Fig. 6 also shows a rod and channel assembly 10, 42 at a vertical wall portion 44 of the chair seat frame or base. Assuming that the channel 42 runs continuously about said wall 44 of the frame the ends of the rod 10, if also substantially continuous (i. e. a loop), may be anchored to one of the side walls 44 to hold the entire rod in position. For example, slightly hooked ends 10a of the rod may be snapped or sprung into place at an appropriate elongated opening 45 in the wall 44. The rod ends 10a for such purpose or at least one of said ends would have appropriate compound curvature so as to interlock with the adjacent end or ends of the opening by forcing said curved and hooked end inwardly over the edge of the opening into seated position beyond such edge.

In place of bulk nails or tacks with flattened faces 27 in the construction according to Fig. 6, each of the upholstery assemblies 50 and 51 shown has a reinforcing or core plate or strip of metal 52 and 53, respectively, providing the nails as parts of said assemblies. Additionally, the assemblies have covering sheet material C and padding P. As illustrated by Fig. 7 nail point elements are formed as at 54 by striking out triangular portions of the sheet metal at right angles to the principal plane of the core sheet or strip. The outstruck nail-forming projections are alternately arranged so that one projection will be inserted at one side of the rod 10 and the next projection at the opposite side of the rod when the upholstery is mounted on the base. Thus the nail elements are automatically curled about the rod in opposite directions alternately along the channel for opposite abutment with the rod. At the right in Fig. 6 two of the nail forming projections 54 are shown in normal position, that is, before clinching, and at the upper part of Fig. 6 one such nail forming projection is shown curled about the rod 10. The clinching is done by effecting localized pressure against the padding cover or by use of a mallet thereagainst.

I claim:
1. In a self-clinching nailing ground comprising a channel and a rod disposed lengthwise of the channel, the improvement comprising the provision of readily penetrable material disposed outwardly from the rod toward the open face of the channel, held therein, and through which a nail can be driven into clinching position about the rod.

2. The construction according to claim 1 wherein said material comprises a strip removably positioned in a guideway formed lengthwise of the channel across said open face.

3. The construction according to claim 1 wherein the said material comprises a strip removably inserted in a guideway formed lengthwise of the channel and the rod is secured to the strip for insertion therewith.

4. The construction according to claim 1 wherein said material comprises a permanently penetrable, initially plastic filler occupying the channel and embedding the rod.

5. A nailing ground comprising a channel with walls sloping toward the center, a rod disposed lengthwise of the channel, means to hold the rod generally spaced from the channel walls and readily penetrable sound deadening material occupying the channel and interposed between it and the rod.

6. A nailing ground for carpeting comprising an open channel adapted to be secured to or in a floor, a rod in the channel, and readily penetrable means overlying the rod and confined against lateral movement by the channel and through which carpet tacks may be driven into clinching relation to the rod to secure the carpeting over the channel.

7. A construction board unit comprising a metal sheet having a plurality of parallel open face channels, nail holding rods secured in the respective channels, a backing sheet of composition board material behind the channels, side edges of the metal sheet extending rearwardly behind the channels and operating to secure the backing sheet on the unit in abutment with the backs of the channels.

MANLEY R. PRICE.

REFERENCES CITED

The following references are of record in the file of this patent:

UNITED STATES PATENTS

| Number | Name | Date |
|---|---|---|
| 1,543,035 | Strid | June 23, 1925 |
| 2,160,794 | Price | May 30, 1939 |
| 2,240,502 | Hall | May 6, 1941 |